(12) United States Patent
Matsuo et al.

(10) Patent No.: US 8,808,907 B2
(45) Date of Patent: Aug. 19, 2014

(54) BATTERY MODULE

(75) Inventors: Hirotatsu Matsuo, Kamakura (JP); Ryoichi Takatsu, Sagamihara (JP); Kaoru Ishii, Yokohama (JP); Naoto Todoroki, Sagamihara (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 15 days.

(21) Appl. No.: 13/702,229

(22) PCT Filed: Jun. 9, 2011

(86) PCT No.: PCT/JP2011/063237
§ 371 (c)(1),
(2), (4) Date: Dec. 21, 2012

(87) PCT Pub. No.: WO2011/155559
PCT Pub. Date: Dec. 15, 2011

(65) Prior Publication Data
US 2013/0108909 A1 May 2, 2013

(30) Foreign Application Priority Data
Jun. 9, 2010 (JP) .................................. 2010-131877

(51) Int. Cl.
*H01M 2/02* (2006.01)
*B65D 85/00* (2006.01)
*H05K 5/00* (2006.01)
*H05K 7/00* (2006.01)

(52) U.S. Cl.
USPC ....... 429/177; 429/163; 206/703; 361/679.01

(58) Field of Classification Search
None
See application file for complete search history.

(56) References Cited

U.S. PATENT DOCUMENTS

2009/0263713 A1* 10/2009 Shi et al. ................... 429/177

FOREIGN PATENT DOCUMENTS

| JP | 2004-047161 | 2/2004 |
|---|---|---|
| JP | 2006-092884 | 4/2006 |
| JP | 2007-087907 | 4/2007 |
| JP | 2007-103284 | 4/2007 |
| JP | 2008-091205 | 4/2008 |

* cited by examiner

*Primary Examiner* — Cynthia K. Walls
(74) *Attorney, Agent, or Firm* — Young Basile (57) ABSTRACT

Disclosed is a battery module which comprises a cell unit that comprises cells, and a case that contains the cell unit. The case comprises: a first member which has a first guide portion, and a second member which has a second guide portion that is fitted into the first guide portion by being slid on the first guide portion.

8 Claims, 7 Drawing Sheets

FIG. 11

# BATTERY MODULE

CROSS-REFERENCE TO RELATED APPLICATION

This application claims priority from Japanese patent application serial no. JP2010-131877, filed Jun. 9, 2010, which is incorporated herein in its entirety by reference.

TECHNICAL FIELD

The present invention relates to a battery module.

BACKGROUND

A battery receiving container is known in which a metal container main body or case with an opening and that houses a flat battery pack of laminated cells inside and a metal lid that closes the opening formed in the metal container main body, wherein an open end periphery of the metal container main body and a lid end periphery of the metal lid are joined each other by seam rolling.

BRIEF SUMMARY

However, there has been a problem for recycling or the like that, in the case of dismantling the binding portion formed by tightening or seam-rolling of that conventional battery, substantial man-hours are required for dismantling or disassembly.

The problem that the present invention attempts to solve is to provide a battery module that facilitates disassembly.

The present invention solves the above problem by storing the cell unit by a first member having a first guide portion and a second member having a second guide portion that mates or engages with the first guide portion by sliding on the first guide portion.

According to the present invention the man-hours for dismantling may be reduced by sliding the second member to dismantle at least part of the case when disassembling the battery module

BRIEF DESCRIPTION OF THE DRAWINGS

The description herein makes reference to the accompanying drawings wherein like reference numerals refer to like parts throughout the several views, and wherein.

DETAILED DESCRIPTION

Described below with reference to the accompanying drawings is an embodiment of the present invention.

Figure 1:
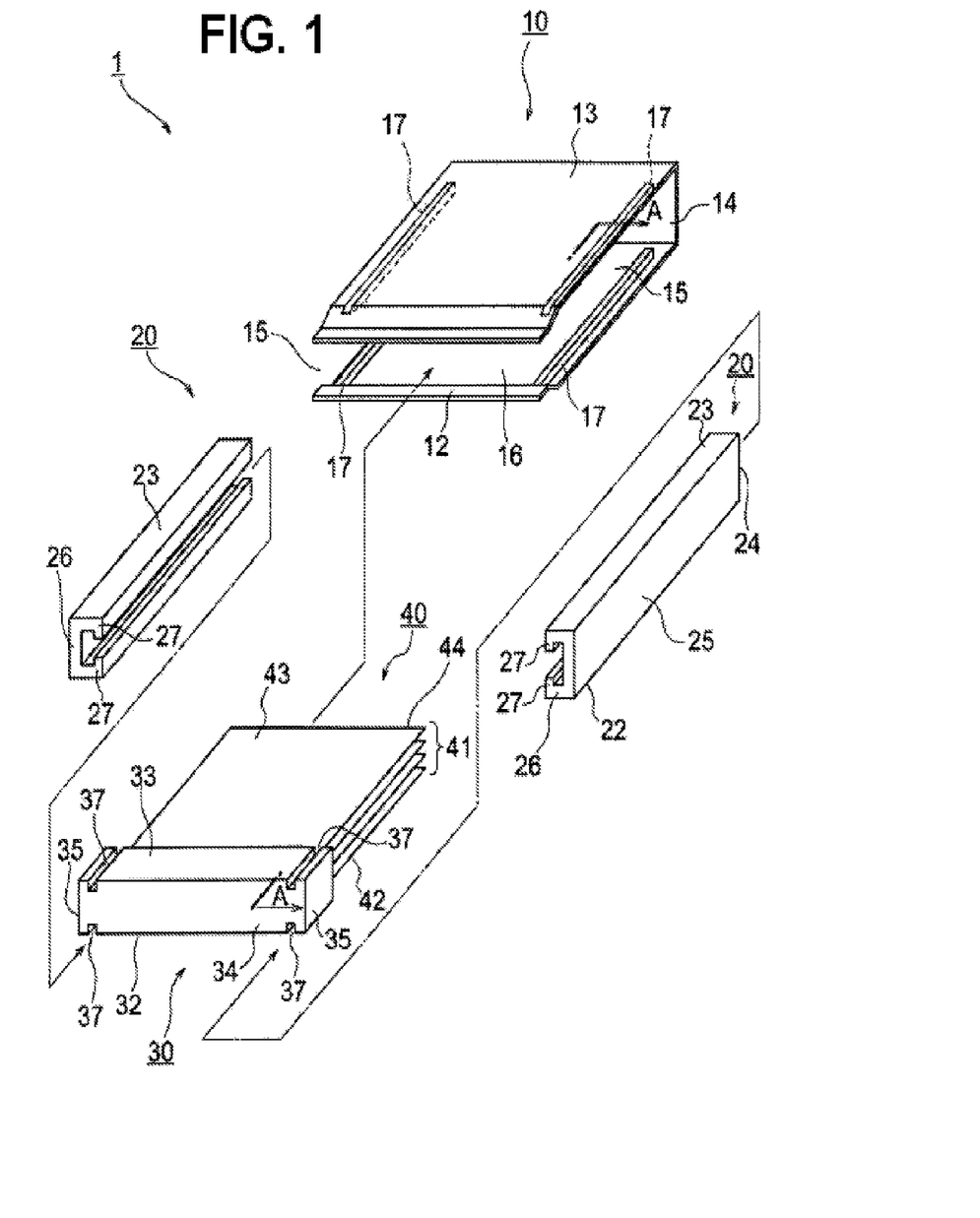
FIG. 1 is an exploded perspective view showing a battery module of an embodiment according to present invention.
Figure 2:
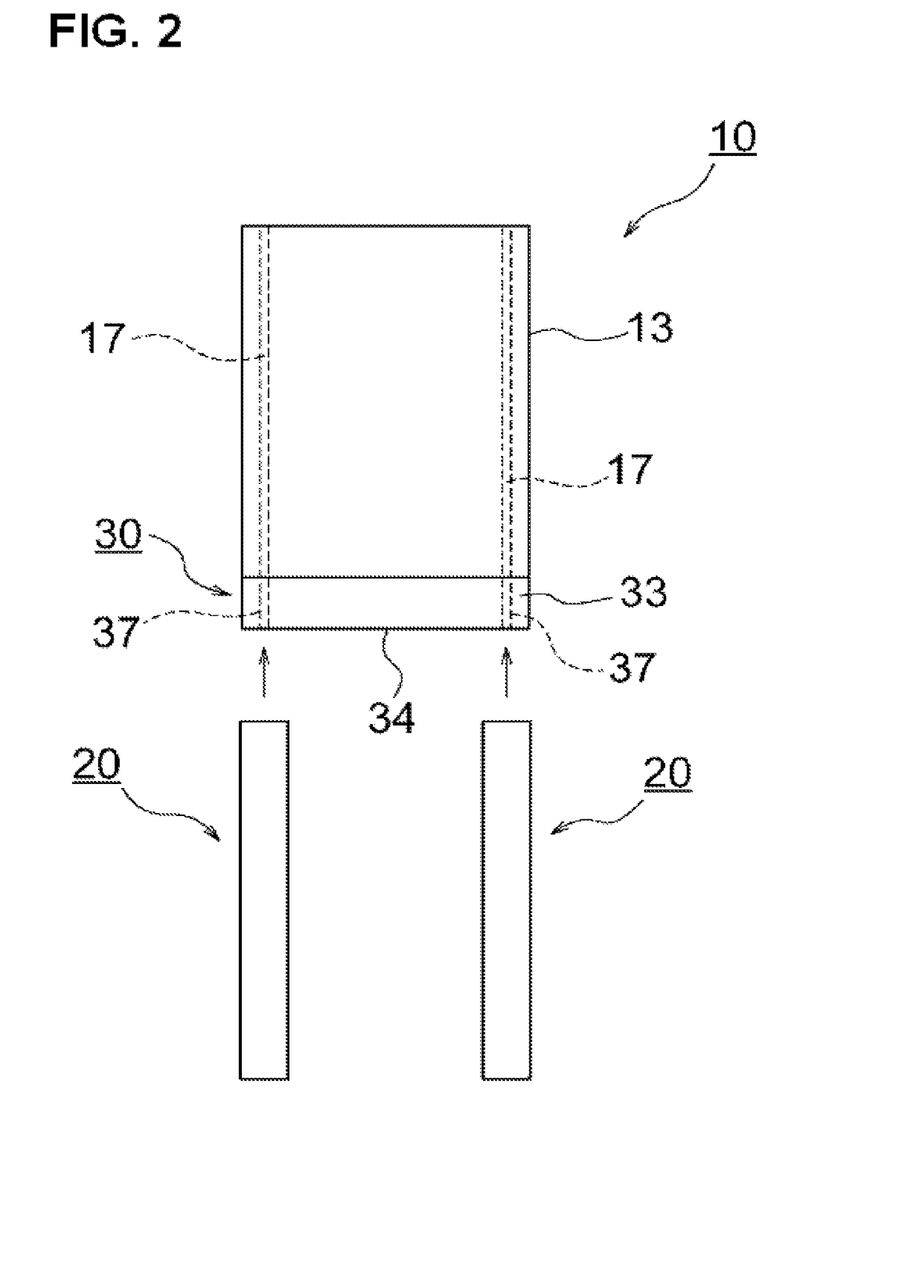
FIG. 2 is a plan view of the battery in dismantled state.

FIG. 1 is an exploded perspective view of a battery module according to the first embodiment, and FIG. 2 is an exploded plan view of the battery module in this example. The battery cell module 1 of this embodiment has a cell unit 40 consisting of a plurality of unit cells 41 stacked on one another, and a container or case accommodating the cell unit 40. The unit cells 41 constituting the cell unit 40 (a stacked body of unit cells) can employ a lithium ion secondary battery with high energy density and sealing ability for example of a sheet-like shape battery in which a power generating element housing therein a pair of internal electrodes, separator, and electrolyte sealed inside a flexible bag-like outer casing member of generally rectangular shape in plan view. Principles of charging and discharging and the internal structure of the lithium ion flat secondary battery are known and therefore omitted for a detailed description thereof. The bag-like outer casing member is composed of laminated films with an inner layer of thermoplastic resin, an intermediate layer of metal foil, and an outer layer of insulating resin and houses the power generation element in a sealing way. Therefore the electrical insulation is ensured except for electrode terminals derived to the outside of the pouched case or package member.

As shown in FIG. 1, the cell unit 40 which is a stack of unit cells 41 is constructed by stacking a plurality of unit cells 41 ("four" in the example shown in FIG. 1). Though not shown, a positive electrode terminal (positive electrode tab) and the negative terminal (negative electrode tab) are sequentially connected directly or by a bus bar. Thus a circuit configuration of four cells 41 connected in series is formed in this example.

The case or container is a rectangular parallelepiped member and includes a first case 10, a pair of second cases 20, and a third case 30, each being made of aluminum alloy or plastic.

The first case 10 is a housing formed in a rectangular shape as shown in FIG. 1, and includes a bottom surface 12 of the first case, a ceiling surface 13 of the first case, and a side wall 14 (also referred to as an end wall) formed by extension from the bottom surface or bottom wall 12 and ceiling surface or top wall 13 of the first case 12. The bottom surface 12 of first case presents a main or principle surface of first case 12 and contacts a main or principle surface 42 of cell unit 40, while the ceiling surface 13 of first case presents another main or principle surface of the first case 10 and contact the other main surface 43 of the cell unit 40 and side wall surface 14 of first case abuts on side wall surface 44 on the short side edge of the cell unit 40. In addition, at both sides of the side wall surface 14 are provided with first opening portions 15. A second opening portion 16 is provided and counter-faces the side wall surface 14 of first case. Thus, the first case 10 is formed as a housing shaped in a U-shape.

The ceiling surface 13 of the first case is provided with a first guide portion 17 at the part of the side of one first opening portion 15 along the side edge of the opening portion 15, while another first guide portion 17 is formed at the part of the side of the other first opening portion 15 along the side edge as well. Similarly, the bottom surface 12 of the first case is provided with a first guide portion 17 at the portion of the side of one first opening portion 15 along the side of the side edge, while another first guide portion 17 is formed at the part of the side of the other first opening portion 15 along the side edge as well. The first guide portion 17 are recessed inwardly from either ceiling surface 13 or bottom surface 14 of first case to form the shape of the rail by cutting out grooves parallel to the first openings 15. The one end of the first guide portion on the side of the second opening 16 is formed to face an opening surface of the second opening portion 16, while the other end of first guide portion 17 on the side wall surface 14 of first case is not formed to be flush with side wall surface 14 of first case but dammed or terminated on the ceiling surface 13 of first case. Since both the ceiling surface 13 of the first case and the bottom surface 12 of the first case are the surfaces extending in the vertical plane with respect to the stacking direction of unit cell 41 (the surface direction of the main or principle surface of the cell unit 40), the first guide portion 17 is formed in a direction perpendicular to the stacking direction of the unit cell 41.

As shown in FIG. 1, the third case 30 is a case that is attached to the short side of the cell unit 40, and holds the side surface of the short side of the cell unit 40. In addition, though not shown, an insulating cover made of insulating material such as plastic may be provided in the third case 30 to ensure the insulation between the cell unit 40 and the third case 30 by the insulating cover. The third case 30 may hold the cell unit 40 through the insulating cover.

The third case 30 is a housing formed in the shape of a rectangular parallelepiped, and provided with a bottom surface 32 of third case, a ceiling surface 33 of third case, a side wall surface 34 of third case (also referred to as an end wall), and opposing side wall surfaces 35 of third case. The third case 30 is provided with a connector (not shown) for electrically connecting the cell unit 40 and external connection terminals (not shown). The side wall surface 34 of third case is formed as an extension from bottom surface 32 of third case and ceiling surface 35 of third case respectively, while side wall surfaces 35 are the side walls formed by extending respectively from short edge of bottom surface 32 of third case and short edge of ceiling surface 33 of third case.

The ceiling surface 33 of third case is provided with a first guide portion 37 at about the edge portion on the side of third side wall surface 35 and formed along the edge, while about the edge of the other third side wall surface 35 is provided with another first guide portion 37 along the edge. Similarly, the bottom surface 32 of third case is provided with a first guide portion 37 at the edge of the one third side wall surface 35 and formed along the edge, while the bottom surface is further provided with a first guide portion 37 at about the edge of the other third surface 35 along the edge. The first guide portion 37 of ceiling surface 33 of third case extends from a part of the long side edge of third side wall surface 34 toward cell unit 40 along third ceiling surface 33 to form a groove with a recessed railed shape. In addition, the one end of first guide portion 37 is flush with the side wall surface 34 of third case while the other end of first guide portion 37 is flush with sidewall surface (a face opposing side wall surface 34 of third case) on the side of cell unit of third case 30. Moreover, since both ceiling surface 33 and of third case and bottom surface 32 of third case are perpendicular to the stacking direction of unit cells 41 (the surface direction of main surface of cell unit 40), the first guide portion 37 is configured to extend perpendicular to the stacking direction of unit cells 41.

By inserting the third case 30 holding cell unit 40 into first case 10 through an entry provided by the second opening 16, the cell unit 40 will be housed in first case 10 to establish mating or fitting relationship between first case 10 and third case 30.

As shown in FIG. 2, when the first case 10 is fitted to the third case 30, part of the ceiling surface 13 of the first case is flush with the ceiling surface 33, first guide portion 17 and the third case 37 are joined, and the first guide portion 17 and the third guide portion 37 corresponding to the first guide portion 17 jointly form the rail groove. Regarding the bottom part of first guide portion 17 and the first guide portion 37, though not shown, the construction is similar to that at part of the ceiling surface, the description is thus omitted.

Figure 3:
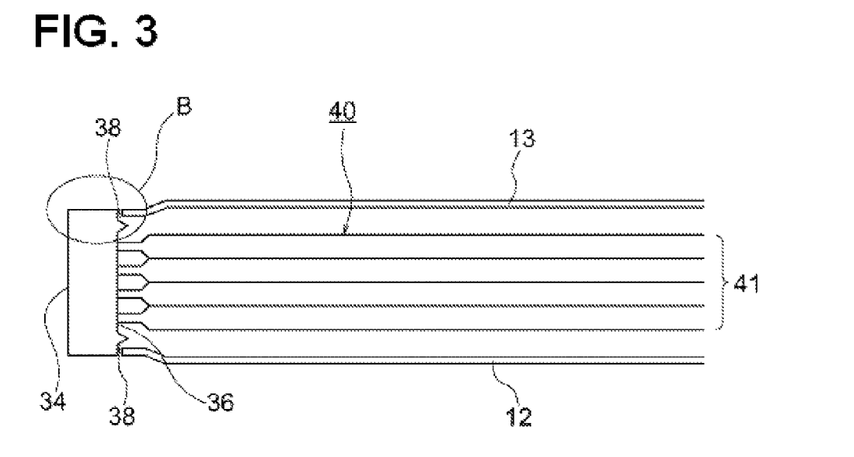
FIG. 3 is a partial cross-sectional view along the line A-A of the battery module of FIG. 1
Figure 4:
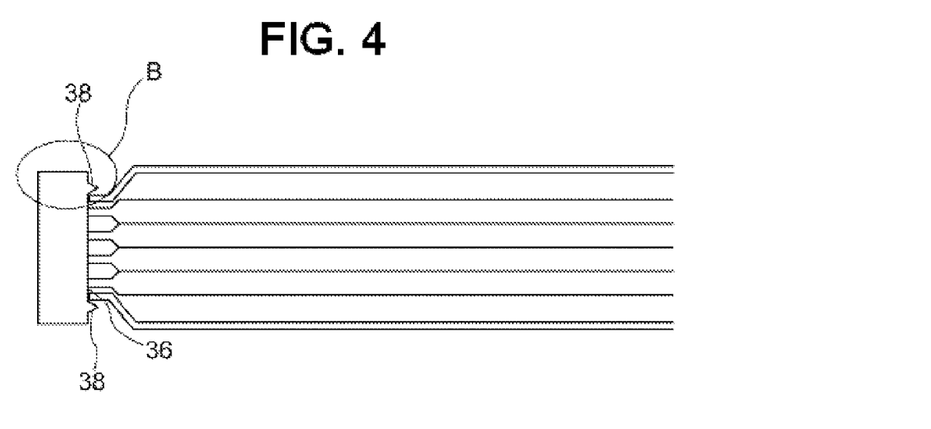
FIG. 4 is a partial cross-sectional view along the line A-A of the battery module of FIG. 1
Figure 5:
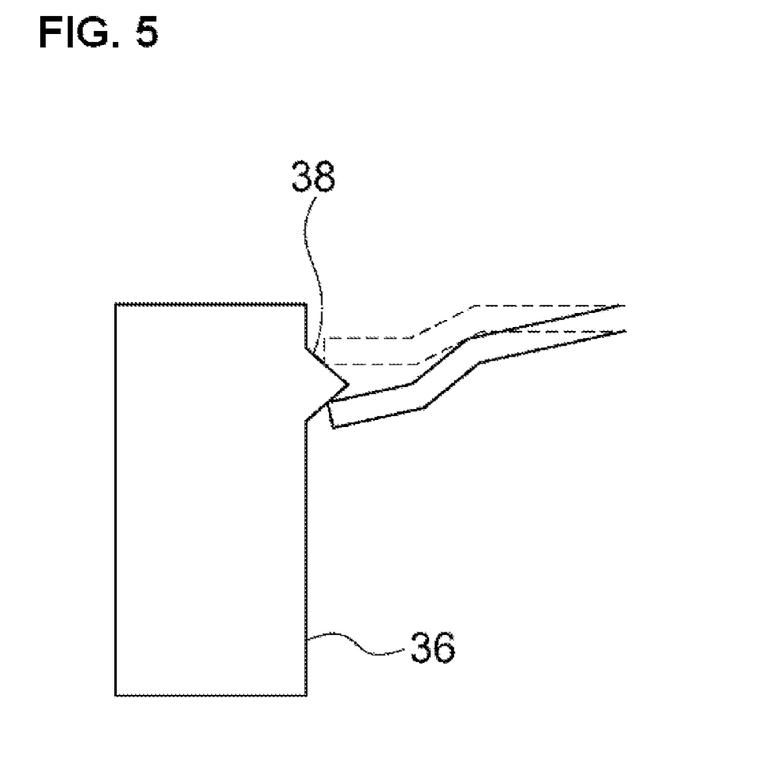
FIG. 5 is an enlarged view of portion B of the battery module in FIGS. 3 and 4.

Next, description will be made with reference to FIGS. 3 to 5, of the fitting portion of the first case 10 and third case 30. FIGS. 3 and 4 are each cross-sectional views along the line A-A of FIG. 1 of the tip portion of first case 10 together with third case. FIG. 3 shows a state before being fitted, while FIG. 4 after fitting. FIG. 5 is an enlarged view of the portion surrounded by line B in FIG. 3 and FIG. 4. Note that the dotted line shows a state before fitting (corresponding to FIG. 3), while the solid line indicates a state after fitting (corresponding to FIG. 4).

As shown in FIG. 3, a side wall surface or end surface 36 of each of the ceiling surface 35 and the bottom surface 32 of the third case 30 is formed on the side of cell unit 40 with an engaging portion 38 with a protruding shape. The engaging portion 38 is formed to advance from side wall surface 36 of third case toward first case 10 to form a convex shape. The tip of the ceiling surface 13 of first case is bent so as to be easily caught on the engaging portion 38, and is configured to have a plane extending parallel to the main surface of ceiling surface of first case such that a surface lower than the main surface is processed to be formed. Similarly, the tip of bottom surface 12 of first case on the side of second opening 12 is bent so as to be easily engaged with the engaging portion 38 and is configured to have a plane parallel to a main surface of bottom surface of first case such that a surface higher than the main surface is processed to be formed.

Because the ceiling surface 13 of the first case and the bottom surface 12 of the first case are each formed in plate-shaped by a metal material to exert elasticity with respect to the direction of each surface. Therefore, by clamping and pressurizing ceiling surface 13 of first case and bottom surface 12 of first case to apply pressure in the direction of main surface of first case, thereby narrowing the second opening 16. Subsequently, by first holding the distance formed by a tip or an end of ceiling surface 13 of first case and a tip of bottom surface 12 of first case smaller than that of engaging portions 38 and abutting the tips against side wall surface 36 of third case, and then releasing the pressure applied in the direction of main surface of first case 10, by elasticity, respective tips of ceiling surface 13 of first case and bottom surface 12 of first case are engaged or caught by the corresponding engaging portion 38. Therefore, the respective tips of second opening 16 are engaged by engaging portions 38. Thus, the tips of second opening 16 are engaged by engaging portions 38 so as for the first case 10 and third case 30 to be fitted or locked to each other.

Returning to FIG. 1, the second case 20 is provided with side wall surfaces 20, 24, 25, 26 of the second case, ceiling surface 23 of second case, and bottom surface 22 of second case. Each second case 20 abuts on the side surface on the side of longer edge and is configured to enclose or cover from the both side surfaces. The ceiling surface 23 of second case is formed with a second guide portion 27 projecting downward along a surface opposing to wall surface 28 of second case. Similarly, the bottom surface 22 of second case is formed with a second guide portion 27 projecting upward along a surface opposing side wall surface 25 of second case. Each second guide portion 27 is formed with a single rail in a projection shape extending from side wall surface 26 of second case along bottom surface 22 of second case and ceiling surface 23 of second case toward sidewall surface 24 of second case. One end or tip of each second guide portion 27 is flush with side wall surface 26 of second case while the other end or tip of each second guide portion 27 is flush with side wall surface 24 of second case. The projection portion of second guide portion 27 is fitted into recessed portions of first guide portion 17 and second guide portion 37.

The length of the rail of the second guide portion 27 equals to a sum of the length of rail of first guide portion 17 and the length of first guide portion 37. Since ceiling surface 23 of second case and bottom surface 22 of second case are such surfaces perpendicular to the stacking direction of unit cells 41 (the surface direction of main surface of cell unit 40), the second guide portion 27 is formed perpendicular to the stacking direction of unit cells 41.

Moreover, as shown in FIGS. 1 and 2, by inserting respective second case 20 from the side of side wall surface 34 of third case, the second guide portion 27 slides on the first guide portion 17 and the first guide portion 37 to establish fitting among first guide portions 17, 37 and second guide portion 27. Thus, the second cases 20 cover the first opening 15 and are abutted on side surface of cell unit 40 to accommodate cell unit 40.

As has been described above, the present embodiment is configured to provide a first guide portion 17 in first case 10 and a second guide portion 27 in second case 20, respectively and by sliding second guide portion 27 on the first guide portion 17 to thereby fit the second case 20 into first case 10 for accommodating the cell unit 40. In this configuration, when dismantling or dissembling the battery cell module in the present embodiment, cell module will be disassembled by sliding second case 20 off the first case 10. Therefore, the man-hours for dismantling may be reduced. In other words, in the conventional battery module in which case is joined by a wound tightening as in the prior art, the effort for dismantling tends to be increased due to cutting through the case by such tool as can opener, deforming the case and separate each case. In contrast, in the present embodiment, the dismantling man-hours will be reduced with a decreased cost of demolition. In addition, when opening the case using a general-purpose tool such as a can opener, conventionally, there is a possibility of damaging the cell unit 40. Since, during dismantling, it is not necessary to frequently use tools such as a can opener, it is possible to reduce the possibility of damaging the cell unit 40. As a result, in this example, working safety may be improved.

Furthermore, by reducing the effort of demolition, the cost of recycling of rare metals contained in the cell unit 40 may be reduced.

Also, in the present embodiment, by providing the sliding mechanism composed of first guide portion 17 and the second guide portion 27, the expansion of the cell unit 40 due to deterioration may be suppressed. Specifically, in the present embodiment, when accommodating cell unit 40 by sliding the second guide portion 27 on the first guide portion 17, the second case 20 would not be subjected to deform and fitted to first case 10 with holding the shape of second case 20. Since the second case is not required to deform when sliding, the rigidity of second case 20 may be enhanced. In addition, with a higher rigidity of second case 20, since the first guide portion 17 and second guide portion 27 function to suppress expansion of cell unit 40. Thus, in the present embodiment, provision of the sliding mechanism may serve to suppress the expansion of cell unit 40 by configuring such that the second case 20 will not deform due to pressure associated with expansion of cell unit 40.

By providing a slide mechanism which consists of first guide portion 17 and second guide portion 27, since the projection portion that projects from the side of the battery module 1 is not formed, when assembling a battery pack by disposing a plurality of battery modules, the degree of freedom in the layout of the battery with reduction of size of the battery.

More specifically, when housing cell unit 40 by locking mechanism projecting from side surface of battery module 1, at the time of dismantling the cell module 1, unlocking the locking mechanism may separate the cell unit 40 from the case. However, in the configuration having the locking mechanism, a projection portion projecting from side surface of the battery module would be formed. On the other hand, in this embodiment, in order to accommodate the cell unit 40 the slide mechanism is used, and the protruding portion which protrudes from the side of the battery module 1 is not formed, thus increasing of the degree of freedom of the layout of the cell will be achieved, while reducing the disassembly labor.

In the present embodiment, the first guide portion 17 is provided in a direction perpendicular to the main surface of a unit cell 41 of flat type along with a second guide portion 27. As in this embodiment, the battery module with flat lithium ion secondary batteries stacked may expand in the direction of the main surface over time due to deterioration. However, with a fitting structure configured to slide second guide portion on the first guide portion 17 disposed in a direction perpendicular to the main surface direction of unit cell 41, a pressure associated with expansion in the main surface direction may be suppressed. Therefore, while ensuring the holding state of the cell unit 40, as described above, a battery module may be achieved with an ease of dismantling.

In the present embodiment, the first guide portion 17 and second guide portion 27 are formed respectively in first case 10 and second case 20 along the edge of first opening 15, thus the second case is configured to clamp or sandwich cell unit 40 via first case 10 from a vertical main surface direction of cell unit 40 to cover the first opening 15 of second case 20. Thus, due to expansion of cell unit 40, the pressure applied on first guide portion 17 and second guide portion 27 will be equalized or uniform. That is, for example, when as compared to the length of the side edge of the ceiling surface of first case on side of the first side opening 15, the length of the first guide portion 17 parallel to the side edge is set extremely short, the length of engagement between the first guide portion 17 and the second guide portion 17 will be caused to be short, the majority part of opening section will not be covered by the case having the sliding mechanism. In this instance, when the cell unit 40 expands, the portion of slide mechanism, i.e., the portion of first opening not covered by second case 20, is subjected to be concentrated application of pressure such that expansion of cell unit 40 may not suppressed. Moreover, when the cell unit 40 expands due to deterioration and the pressure due to expansion is applied locally, there is a possibility that the gas generated within the cell unit 40 will be retained, resulting in reduction in the output of the battery.

On the other hand, in the present embodiment, since the slide mechanism composed of first guide portion 17 and second guide portion 27 is configured to cover the entire first opening 15, the pressure applied on the slide mechanism generated due to expansion of cell unit 40 will be made uniform so that the expansion of cell unit 40 may be suppressed. In addition, due to the uniformed application of pressure in response to expansion by the deteriorated cell unit 40, an output decrease in battery may be prevented that would lead to a longer battery life.

Moreover, in the present embodiment, by engaging the end or tip of second opening 16 of first case with engaging portion 38 of third case 30, the first case 10 is fitted to third case 30. Thus, when disassembling for recycling purpose, the battery module 1 in the present embodiment will be configured for ease of dismantling with reduced man-hours associated.

Figure 8:
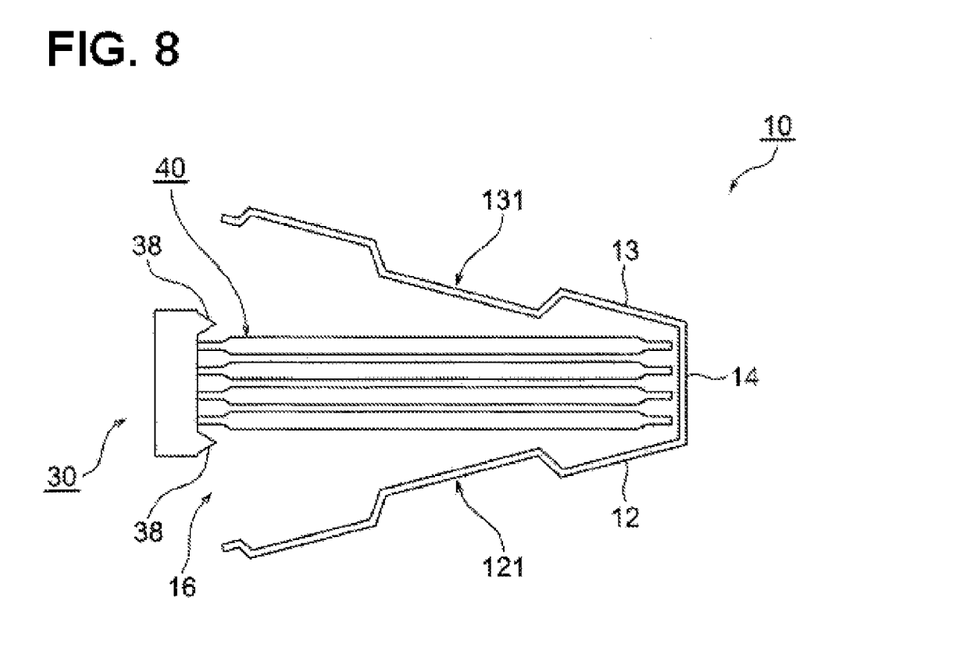
FIG. 8 is an exploded side view showing a modification of the battery module of FIG. 1.

In the present embodiment, as shown in FIG. 8, the ceiling surface 13 of the first case and the bottom surface 12 of the first case may be provided with a recess 131 and a recess 121 respectively. FIG. 8 is an exploded side view of the first case 10, the third case 30 and the cell unit 40 in the modification according to the present invention, which shows a state before inserting the second case. The recess 131 and recess 121 are provided in the center portion of main surface of ceiling surface 13 of first case and in the center portion of main surface of bottom surface 12 of first case respectively, and are configured to be recessed inwardly from ceiling surface 13 of first case and bottom surface of first case, respectively. Further, as described above, ceiling surface 13 of first case and bottom surface 12 of first case are formed by plate-shaped metal material to provide elasticity by forming a leaf spring with respect to the direction of the surface of each surface. In the state where the external force is not applied, the ceiling surface 13 of the first case and the bottom surface 12 of first case expand or widen toward the second opening 16 from the side wall 14 of the first case, i.e. to be open with respect to each major surface.

Then by exerting pressure on both the ceiling surface 13 of first case and bottom surface 12 of first case thereby narrowing the second opening 16 to engage engaging portion 38 with the respective tips of ceiling surface 13 of first case and bottom surface 12 of first case. The engaging portions 38 restrict the spread of the bottom surface 12 of first case and the ceiling surface 13 of the first case toward the surface direction. In this state, since the recess 131 and recess 121 are recessed toward the cell unit 40, therefore by having recess 131 and recess 121 contact main surface 43 and 44 of cell unit 40, cell unit 40 will be sandwiched by recess 131 and recess 121 to be held in first case.

As described above, the first case 10 is formed so as to extend toward the second opening 16 from the side wall surface 14 of the first case. Thus, the ceiling surface 13 of the first case and bottom surface 12 of the first case are sandwiched to accommodate cell unit 40, thus the assembly of battery module will be made easier.

Further, in this embodiment, the engaging portion 38 restricts an expansion of ceiling surface 13 of first case and bottom surface of first case in the main surface direction. Thus, when disassembling the battery module, by removing the restriction by the engaging portions of the spread of the first case 10, the first case 10 and cell unit 40 may be disassembled with ease, which leads to an easily disassembly of the battery module.

In addition, in the present embodiment, the ceiling surface 13 of the first case and the bottom surface 12 of first case are provided with recess 131 and 121 respectively to be recessed toward cell unit 40. Thus, by having recess 131 and recess 121 in contact with main surface 43 and main surface 42 of cell unit 40 respectively thereby clamping cell unit 40 in the direction of main surface, the main surface of cell unit 40 and the inner surface of first case 10 may be held securely.

In addition, the battery module may expand in the stacking direction due to deterioration over time. In the present invention, by providing the recess 121 and the recess 131 respectively on the ceiling surface 13 of first case and bottom surface 12 of first case, ceiling surface of first case 13 and bottom surface 12 of first case may be increased in rigidity in the direction of main surface such that the expansion of battery module may be suppressed.

In addition, in the present embodiment, a layered adhesive member may be provided between the recess 131 and the cell unit 40, or, between the recesses 121 and the cell unit 40 so that the main surface of the cell unit 40 can be bonded and fixed firmly to the inner surface of the first case 10. Disassembly of cell model may be performed easily.

Figure 6:
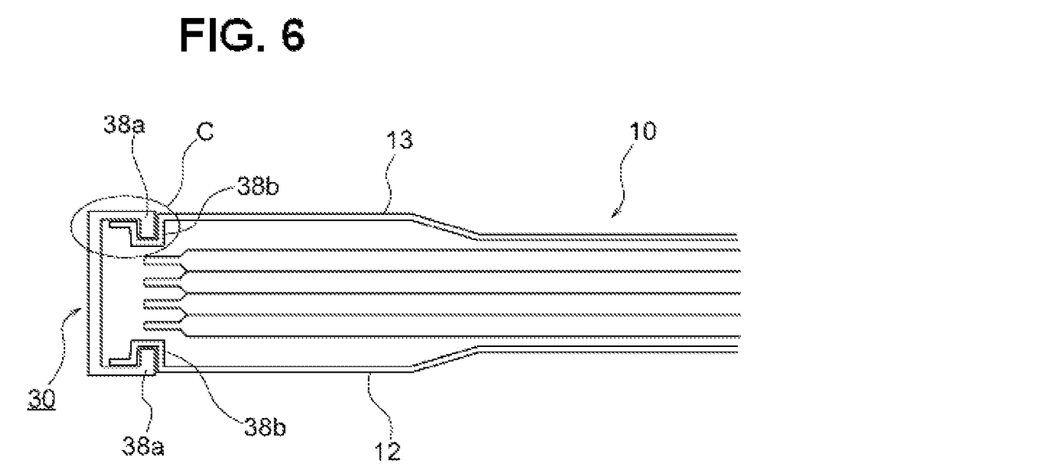
FIG. 6 is a partial cross-sectional view showing a modification of the battery module of FIG. 4.
Figure 7:
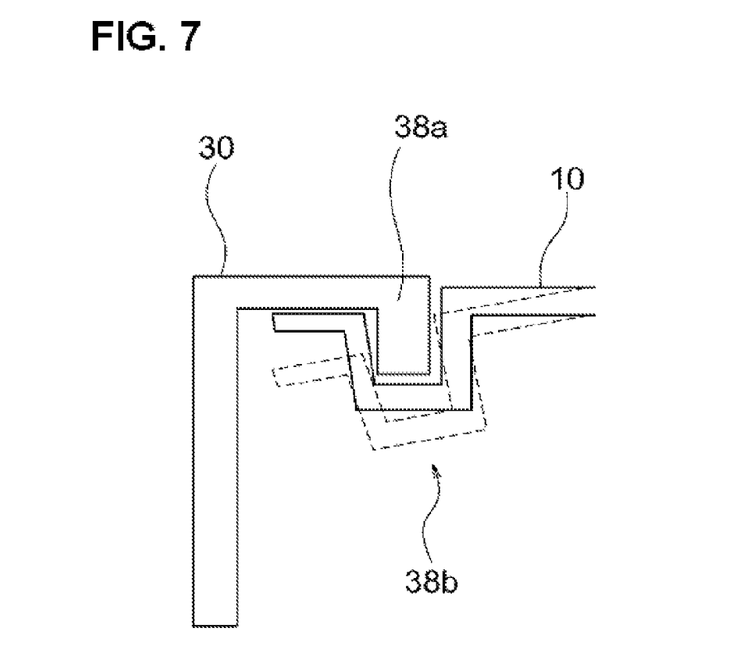
FIG. 7 is an enlarged view of a portion C of the battery module in FIG. 6.

It should be noted that this embodiment forms the engaging portion 38 in a convex shape. However, as shown in FIGS. 6 and 7, fitting portion may be formed in a flange. FIG. 6 is a figure of modification corresponding to the sectional view along A-A in FIG. 1, and illustrates the state after the first case 10 and third case 30 have been fitted together. FIG. 7 is a partial exploded view of the portion enclosed by the line C in FIG. 6. Note that the dotted line indicates a state before fitting while the solid line indicates the state after fitting (corresponding to FIG. 4).

As shown in FIGS. 6 and 7, the sidewall of third case 30 is opened on the side of the cell unit 40 and ceiling surface 33 of third case is provided with an engaging portion 38a projecting downward while the bottom surface 32 of third surface with engagement portion 38a projecting upward. In addition, the cross section of third case in generally formed in "U" shape. Similarly, ceiling surface 10 of first case has at its edge on the side of opening 16 formed with a recess-shaped engaging portion 38b along the projection of engaging portion 38a. Furthermore, as in FIGS. 1 to 3, by engaging portion 38a and engaging portion 38b with holding under pressure ceiling surface 13 of first case and bottom surface 12 of first case such that fitting between first case 10 and third case 30 may be established.

It should be noted that, although in this embodiment, the first guide portion 17, 37 and second guide portion 27 are provided in a direction perpendicular to the stacking direction of unit cells 41, they may be in parallel thereto or may be in a direction other than the perpendicular or parallel direction.

The configuration need not necessarily be that four first guide portion 17, 37 and four second guide portions 27 are not necessarily required, but only one would suffice.

In addition, in this embodiment, the configuration of case is not necessarily limited to a composition of first case 10, second case 20 and third case 30. The first case must not in the form of a U-shape. In addition, bottom surface 12 of first case and ceiling surface 13 of first case may be separately provided from side wall surface 14 of first case.

The first case 10 corresponds to the "first member" according to the present invention while the second case 20 corresponds to the "second member".

Figure 9:
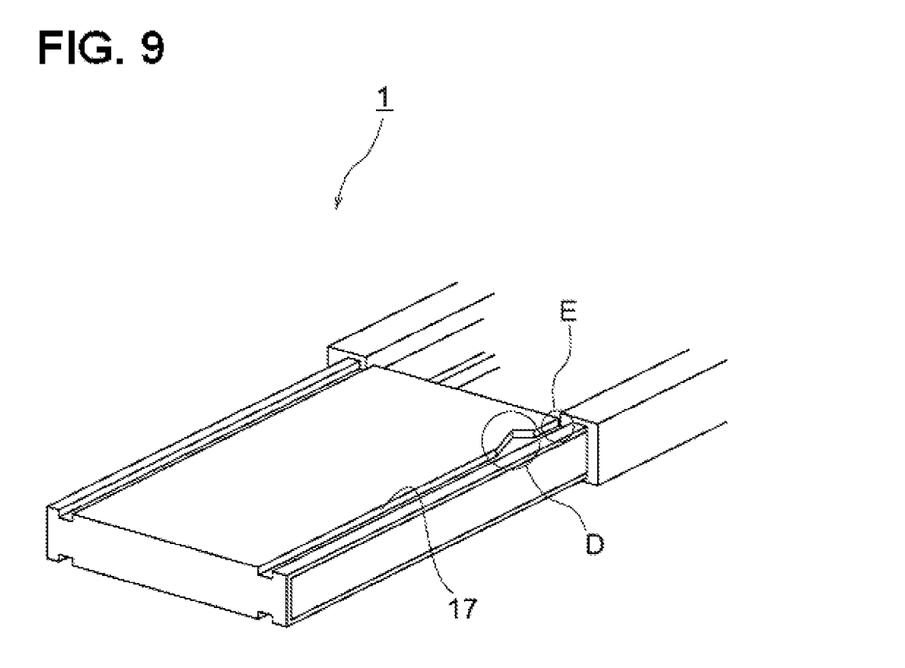
FIG. 9 is a perspective view of a battery module of an embodiment according to the present invention.
Figure 10:
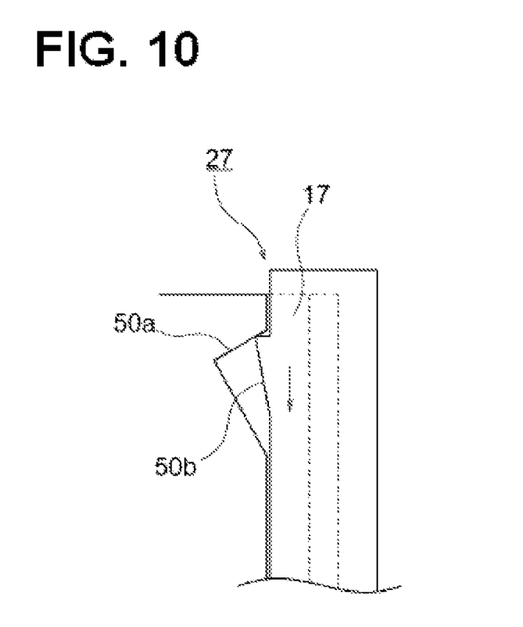
FIG. 10 is an enlarged view of portion D of the battery module of FIG. 8.

FIG. 9 shows an exploded perspective view of a battery module according to another embodiment according to the present invention. The point of difference over the battery module in the first embodiment resides in provision of fixing portion. The description regarding the first embodiment is incorporated appropriately for the remaining elements. FIG. 10 is an enlarged plan view of the portion encircled by D in FIG. 8.

As shown in FIGS. 9 and 10, the fixing portion 50 includes a fixing portion 50a which is provided on the first guide portion 17 and a fixed portion 50b provided in the second guide portion 27. Fixing portion 50a is formed by recessing a portion of side wall surface of first guide portion 17 outward of first guide portion 17 and the shape of recess has a triangular shape when viewed from ceiling surface 13 of first case. When viewed from ceiling surface 13 of first case, the inclination of edge of fixing portion 50a on the side of direction of insertion of second case (see the direction of arrow in FIG. 10) is set smaller than the inclination on the side of opposite direction (see FIG. 10, reversed direction from the arrow).

The fixing portion 50b is formed with a shape protruding a portion of side wall surface 27 of second guide portion 27 outwardly from first guide portion 17. The protruded shape has a triangular shape when viewed from ceiling surface 23 of second case. When viewed from ceiling surface of second case, the inclination of edge of fixing portion 50b in the direction of insertion of second case 20 (direction of arrow in FIG. 10) is set smaller than the inclination of the edge in the direction opposite to the direction of insertion (opposite to the arrow in FIG. 10).

When inserting second case 20 in first case 10, the edge of smaller inclination of fixing portion 50b is brought into contact with first guide groove 17, the fixing portion 50 is configured to allow the insertion of second case 20 in first case 10. On the other hand, when withdrawing second case 20 from the first case 10, since the edge of large inclination of fixing portion 50b is in contact with the side of a large inclination of the fixing portion 50a to restrict the movement, fixing portion 50 is formed to prevent second case 20 from being withdrawn from first case 10.

Thus, in the present embodiment, since second case 20 may be configured to be hard to slide, the function of holding the cell unit 40 may be sustained.

Figure 11:
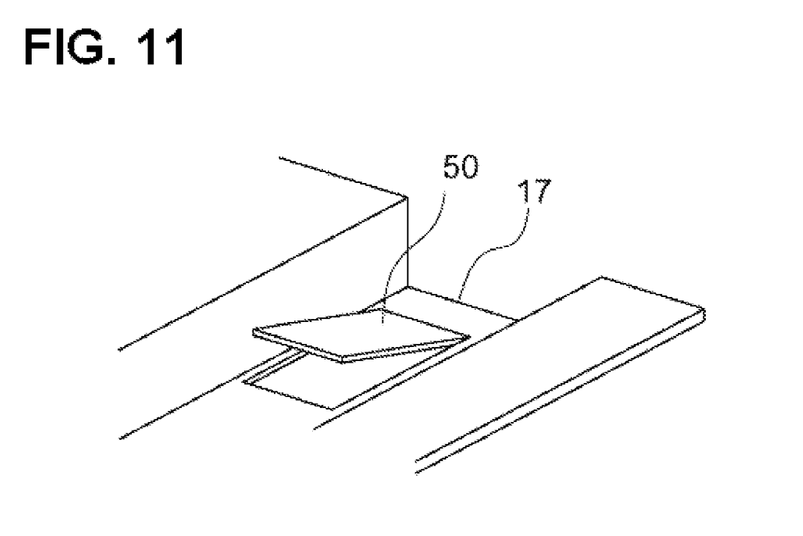
FIG. 11 is an enlarged view of the portion E of the battery module of FIG. 8.

Incidentally, in this embodiment, in addition to the fixing portion 50 shown in FIG. 10, a fixing portion 50 may be provided as shown in FIG. 11. FIG. 11 shows an enlarged perspective view of a portion surrounded by E in FIG. 9. As shown in FIG. 11, the fixing portion 50 is formed by cutting out a portion of the bottom surface of the first guide portion 17 and deflecting toward the inside of the first guide portion 17 of the bottom surface. When inserting second case 20 into the first case 10, the fixing portion 50 is flush with the bottom surface of first guide portion 17 so that fixing portion 50 is configured to allow for the second case 20 to be inserted into first case 10. On the other hand, when withdrawing second case 20 from first case 10, the tip of fixing portion 50 abuts against the side wall of second guide portion 27 and is subjected to movement restriction so that fixing portion 50 is configured to inhibit the withdrawal of second case 20 form first case 10.

Note that the fixing portions 50 as shown in FIGS. 10 and 11 need not necessarily be provided both, but only one fixing portion may be sufficient.

As described above, in the present embodiment, since at least one of first guide portion 17 and second guide portion 27 is provided with fixing portion 50, during normal use, the second case 20 may be configured to be difficult to side and the function of maintain the ability for holding cell unit 40 may be maintained.

The invention claimed is:

1. A battery module comprising:
a cell unit including unit cells, the cell unit housed in a case, the case comprising:
a first member having a top wall and a bottom wall each with a first guide portion, and an end wall, wherein the top wall and the bottom wall are flexible and each has a free distal end;
a second member comprised of two side members each having a first rail portion configured to slide along the first guide portion to thereby engage the first member with the second member to form sides of the case; and
a third member engaging an end of the cell unit, the third member having a top wall and a bottom wall each with a second rail portion configured to receive the first guide portion and an end wall positioned opposite the end wall of the first member, wherein
each of the top wall and the bottom wall of the third member have an end surface facing opposite the end wall of the third member, each end surface having an engaging portion extending therefrom, and
the free distal end of the top wall of the first member engages the engaging portion of the top wall of the third member and the free distal end of the bottom wall of the first member engages the engaging portion of the bottom wall of the third member, each free distal end biased against a respective engagement portion when the case is in a closed case position.

2. The battery module as claimed in claim 1, wherein the unit cell is a flat battery, and a respective first guide portion is configured to extend from the top wall and the bottom wall of the first member in a direction perpendicular to a main surface of each of the top wall and the bottom wall.

3. The battery module as claimed in claim 1, wherein the case further comprises a fixing portion provided on at least one of the first guide portion and the first rail portion configured to allow insertion of the second member while inhibiting withdrawal of the second member.

4. The battery module as claimed in claim 1, wherein the case is a rectangular parallelepiped shape and the cell unit is received in the first member such that an inner surface of the top wall is in contact with a top surface of the cell unit in the stacking direction and an inner surface of the bottom wall is in contact with a bottom surface of the cell unit, wherein the first guide portion extends from the inner surfaces of the first member proximate an edge of the inner surface; and wherein
side openings between side edges of the top wall and the bottom wall of the first member are respectively covered by one of the two side members of the second member, which abuts respective sides of the cell unit.

5. The battery module as claimed in claim 1, wherein the first member is configured to widen a space between the top wall and the bottom wall from the end wall toward the free distal ends of the top wall and the bottom wall.

6. The battery module as claimed in claim 1, wherein the engaging portion of both the top wall and the bottom wall of the third member restricts expansion in the stacking direction of the top wall and the bottom wall of the first member.

7. The battery module as claimed in claim 1, wherein at least one of the top wall and the bottom wall of the first member has a centralized concave recess recessed toward the cell unit and configured to contact the cell unit.

8. The battery module as claimed in claim 3, wherein the fixing portion comprises a notch in the first guide portion configured to receive a protrusion on the first rail portion when the first rail portion is slide along the first guide portion toward the closed case position and prevent removal of the protrusion when the first rail portion is slide along the first guide portion toward an open case position.

* * * * *